United States Patent [19]

Sogo et al.

[11] Patent Number: 5,456,133
[45] Date of Patent: Oct. 10, 1995

[54] SHIFT LOCK DEVICE FOR AUTOMATIC TRANSMISSION

[75] Inventors: Yoshitaka Sogo; Hideki Kanematsu; Kazuo Takahashi, all of Kariya, Japan

[73] Assignee: Tsuda Kogyo Kabushiki Kaisha, Kariya, Japan

[21] Appl. No.: 68,288

[22] Filed: May 18, 1993

[30] Foreign Application Priority Data

Dec. 17, 1992 [JP] Japan .................. 4-355862

[51] Int. Cl.⁶ .................. G05G 1/04; G05G 5/06
[52] U.S. Cl. .................. 74/526; 74/532; 192/4 A; 70/245
[58] Field of Search .................. 74/512, 526, 528, 74/532, 538; 192/4 A; 20/245, 247, 248

[56] References Cited

U.S. PATENT DOCUMENTS

| | | | |
|---|---|---|---|
| 5,025,901 | 6/1991 | Kito et al. | 192/4 A |
| 5,127,245 | 7/1992 | Imai et al. | 192/4 A X |
| 5,257,551 | 11/1993 | Iwata | 74/538 X |
| 5,309,744 | 5/1994 | Kito et al. | 70/247 |

FOREIGN PATENT DOCUMENTS

| | | | |
|---|---|---|---|
| 1171722 | 12/1989 | Japan | 192/4 A |
| 2-458 | 1/1990 | Japan | 192/4 A |
| 2-240451 | 9/1990 | Japan | 192/4 A |

*Primary Examiner*—Vinh T. Luong
*Attorney, Agent, or Firm*—Dennison, Meserole, Pollack & Scheiner

[57] ABSTRACT

A shift lock device includes a locking mechanism for locking an engagement pin which is required to shift a shift lever from a parking position to a position other than the parking position under a desired condition, an actuator for releasing a locking condition of the locking mechanism, a control switch adapted to detect as to whether the shift lever is positioned in the parking position or not and generate a corresponding signal, and a controller being adapted to receive the signal from the control switch and generate a corresponding signal for controlling the actuator. The locking mechanism, the actuator, the control switch and the controller are enclosed in a housing.

5 Claims, 8 Drawing Sheets

SHIFT LOCK DEVICE FOR AUTOMATIC TRANSMISSION

BACKGROUND OF THE INVENTION

The present invention relates to a shift lock device which may preclude a shift lever from operating under certain conditions when the shift lever is positioned in a parking position.

A conventional shift lock device of a shift system generally includes a locking mechanism, an actuator (for example, a solenoid), a control switch and a controller (for example, a microcomputer). The locking mechanism has a locking plate to be engaged with an engagement pin provided on a shift lever when the shift lever is positioned in a parking position, and has a stopper plate to restrict the motion of the locking plate. The stopper plate is moved between a locking position and a released position by the action of the actuator. The control switch detects the position of the shift lever and generates a signal corresponding to the position of the shift lever. The controller is provided with the signal from the control switch. The controller is further provided with signals from an ignition switch, a foot brake and other components. The controller controls the actuator based on these signals.

When the shift lever is positioned in the parking position, the locking plate is engaged with the engagement pin and is lifted up. The actuator is normally deenergized so that the stopper plate remains in the locking position which may prevent downward motion of the locking plate. Therefore, the stopper plate may preclude downward motion of the engagement pin, thereby preventing operation of the shift lever. Upon energization of the actuator, the stopper plate is moved to the released position which may allow downward motion of the locking plate. As a result, the engagement pin can be moved downward to operate the shift lever.

In the shift lock device, the construction elements thereof are generally separately mounted on a shift lever supporting plate and a detent plate of the shift system.

In the prior art, a shift lock device has been developed, as in Japanese Laid-Open Utility Model Publication No. 2-458. In this shift lock device, the control switch is integrated into the locking plate of the locking mechanism to form an integral part which is mounted on the detent plate together with the actuator.

However, such arrangement of the construction elements of the shift lock device cause fluctuations of a relative position of the locking mechanism and the actuator, thereby causing fluctuations of a relative position of the locking plate and the stopper plate moved by the actuator. To compensate the fluctuations of the relative position of the locking plate and the stopper plate for preventing relative interference therebetween in motion, these members are generally sized so as to loosely interact each other or are adapted to move over a wide moving range. This may require an increased space to mount the shift lock device.

Further, when the controller is separated from the control switch, complicated wiring is required to electrically connect therebetween. This may lead to decreased reliability and durability of the shift lock device.

Other prior art shift lock devices are found, for example, in Japanese Laid-Open Utility Model Publication No. 1-171722.

SUMMARY OF THE INVENTION

It is an object of the invention to provide a shift lock device which may effectively prevent fluctuations of a relative position of the the moving members of the locking mechanism.

It is another object of the invention to provide a shift lock device which may eliminate complicated electrical wiring between the electric devices.

According to the present invention, there is provided a shift lock device including a locking mechanism for locking an engagement pin which is required to shift a shift lever from a parking position to a position other than the parking position under a desired condition, an actuator for releasing a locking condition of the locking mechanism, a control switch coupled with the locking mechanism, the control switch being adapted to detect as to whether the shift lever is positioned in the parking position or not and to generate a corresponding signal, a controller adapted to receive the signal from the control switch and generate a corresponding signal for controlling the actuator, and a housing enclosing the locking mechanism, the actuator, the control switch and the controller.

An important feature of the present invention is that since all of the construction elements of the shift lock device are enclosed in the housing, fluctuations of a relative position of the locking mechanism and the actuator are effectively minimized. Therefore, the moving members of the locking mechanism are not required to loosely interact with each other and are not required to move over a wide moving range, thereby permitting minimization of the shift lock device.

Another feature of the present invention is that complicated wiring is not required to electrically interconnect the controller, control switch and the actuator, thereby permitting enhanced reliability and durability of the shift lock device.

The present invention will become more fully apparent from the claims and the description as it proceeds in connection with the drawings.

DETAILED DESCRIPTION OF THE PREFERRED EMBODIMENTS

A first embodiment of a shift lock device according to the present invention will now be described with reference to FIGS. 1–5, 7 and 8.

Figure 5:
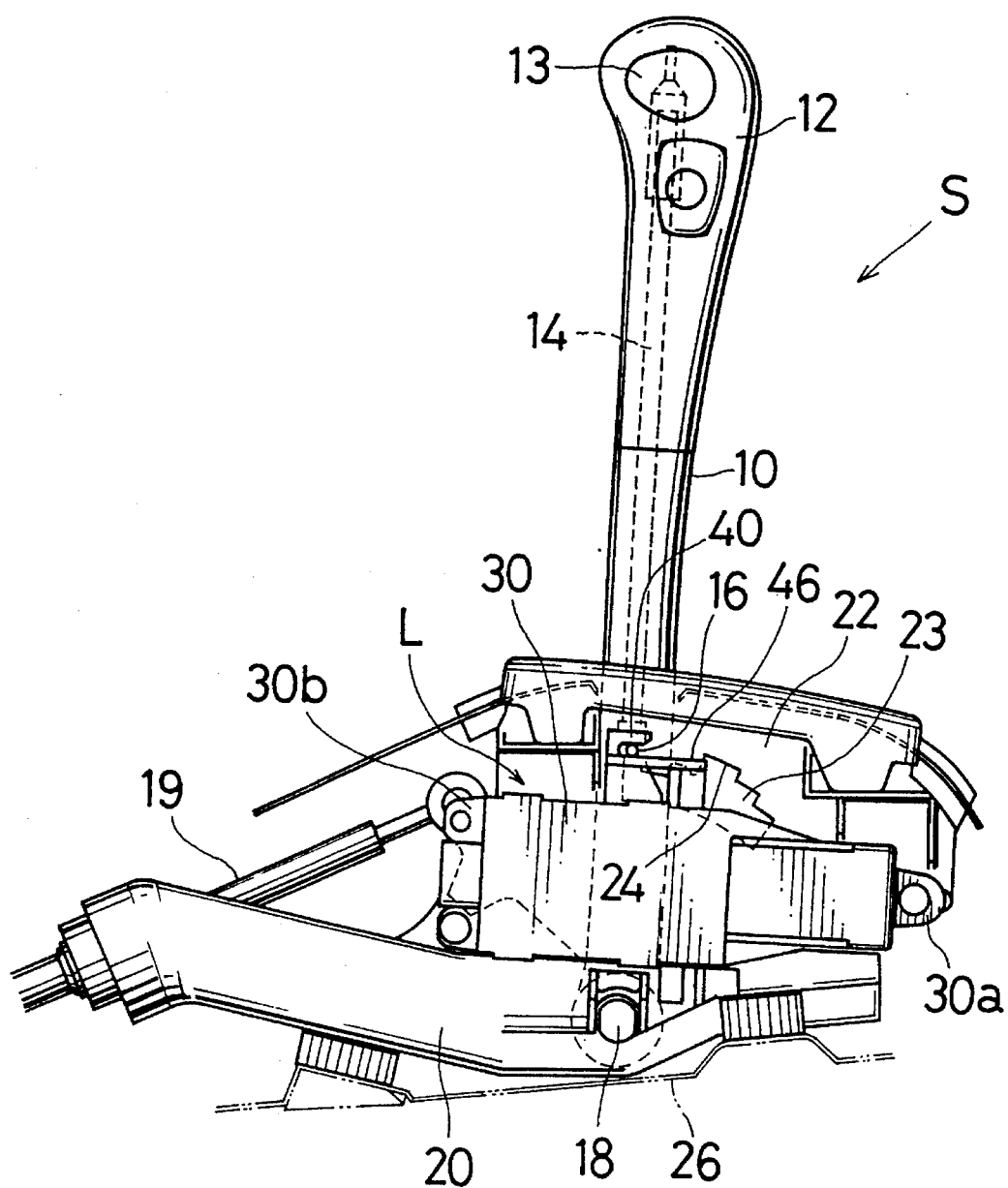
FIG. 5 is a plan view of a shift system assembled with the shift lock device.

Referring to FIG. 5, shown therein is a shift system S including a shift lock device L for use with an automatic transmission of an automobile. As shown therein, a shift lever 10 is pivotally mounted on a shift lever supporting plate 20 through a shaft 18. The shift lever supporting plate 20 is fixedly mounted on a floor panel 26 of an automobile body. The shift lever 10 is connected to an automatic transmission (not shown) through an actuator cable 19. As is well known, when the shift lever 10 is shifted to a desired position, the motion of the shift lever 10 is transferred to the automatic transmission through the actuator cable 19 to change operation ranges of the automatic transmission.

As shown in FIG. 5, a detent rod 14 is movably received in the shift lever 10. The detent rod 14 is normally upwardly biased by a return spring (not shown). The lower end of the detent rod 14 is provided with an engagement pin 16 which is transversely projected from the shift lever 10. The shift lever 10 is provided with a push button 13 at the upper side portion thereof. The push button 13 is linked to the detent rod 14 so as to downwardly move the detent rod 14 together with the engagement pin 16 against the spring force of the return spring when it is pushed.

As shown in FIG. 5, the shift lever supporting plate 20 is integrally provided with a detent plate 22. The detent plate 22 has an opening 23 which extends along the moving direction of the shift lever 10 and into which the engagement pin 16 is received. The opening 23 of the detent plate 22 includes a stepped upper edge surface 24 having a plurality of steps which correspond to positions of the shift lever 10. The engagement pin 16 is normally urged to the stepped upper edge surface 24 by the action of the spring force of the return spring. As a result, the shift lever 10 can not be operated unless the push button 13 is pushed to downwardly move the detent rod 14 against the biasing force of the return spring. Therefore, for example, to move the shift lever 10 from a reverse position to a parking position for changing the operation ranges of the automatic transmission from a reverse range to a parking range, the push button 13 is pushed down to downwardly move the detent rod 14 before operating the shift lever 10 from the reverse position (referred to as "R position" hereinafter) to the parking position (referred to as "P position" hereinafter). It is to be noted that the parking range is an operation range similar to a neutral range except that an output shaft of an engine is sufficiently locked by desired means. As will be easily understood, when the push button 13 is pushed down to lower the detent rod 14, the engagement pin 16 is separated from the stepped upper edge surface 24 so as to move beyond a step of the stepped upper edge surface 24, thereby permitting operation of the shift lever 10.

Figure 1:
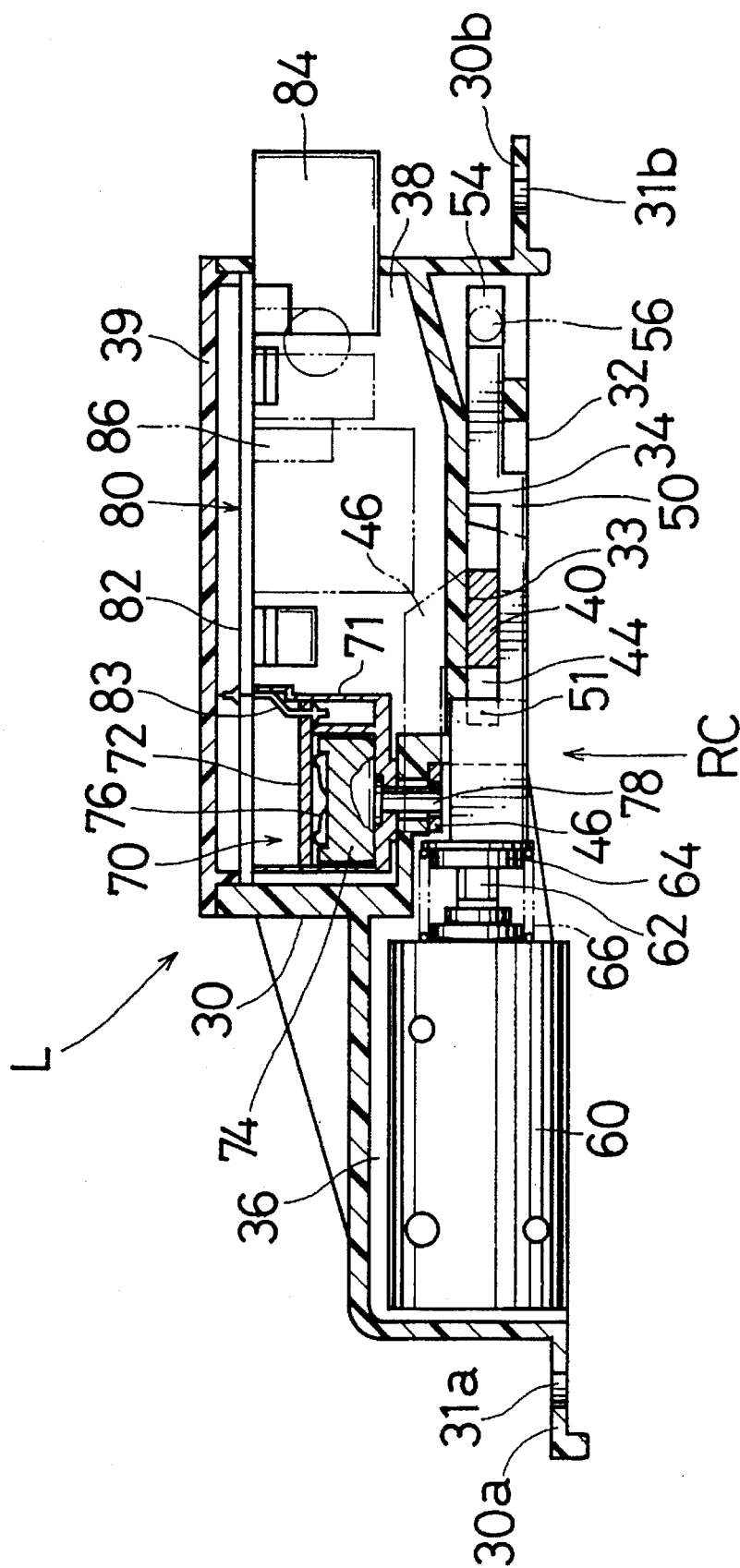
FIG. 1 is a sectional view taken along the line I—I of FIG. 2.
Figure 2:
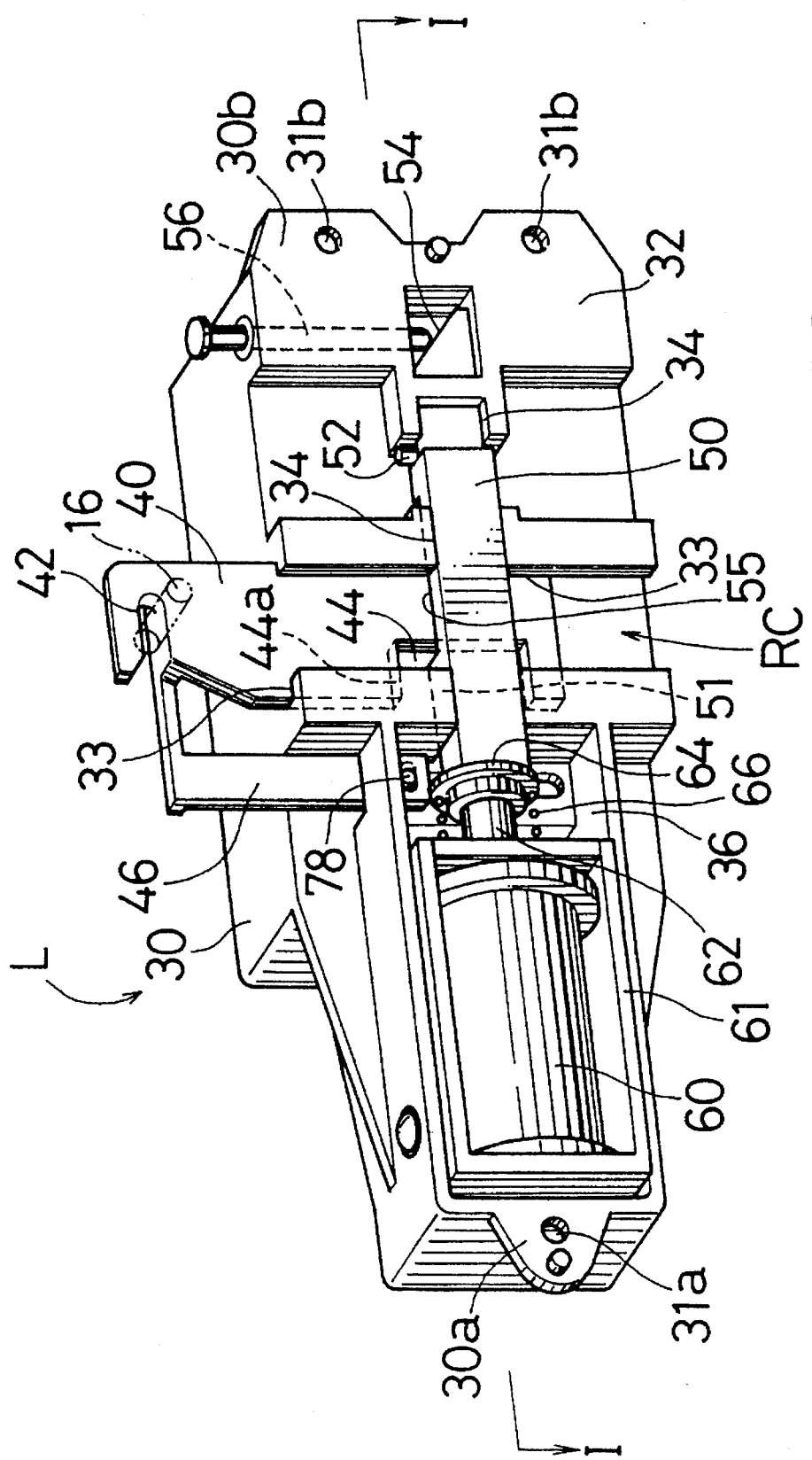
FIG. 2 is a perspective view of a shift lock device according to a first embodiment of the present invention showing the condition in which a solenoid is deenergized to prevent sliding motion of a locking plate to thereby prevent operation of an engagement pin.

Referring now to FIGS. 1 and 2, shown therein in detail is the shift lock device L.

As shown therein, the shift lock device L includes a housing 30 having a pair of flanged portions 30a, 30b at the both ends thereof. The flanged portions 30a, 30b have thorough holes 31a, 31b into which bolts (not shown) are inserted for mounting the housing 30 on the shift lever supporting plate 20 (FIG. 5). The housing 30 has a connecting surface 32, a vertical first guide portion 33 and a transverse second guide portion 34 at the front side thereof. The housing 30 also has a first chamber 36 and a second chamber 38 opening in the front side and the rear side thereof, respectively. The second chamber 38 is received with a control switch 70 and a controller 80 including microcomputers (which will be explained more fully hereinafter) and is covered by a cover plate 39.

As best shown in FIG. 2, the shift lock device L includes a locking mechanism RC. The locking mechanism RC includes a locking plate 40 having a notch 42 at the upper end thereof and slidably received in the first guide portion 33 of the housing 30. The notch 42 of the locking plate 40 is adapted to receive the engagement pin 16 when the shift lever 10 is positioned on the P position. As will be understood, FIGS. 1 and 2 shows a condition that the notch 42 is engaged with the engagement pin 16 and that the locking plate 40 is lifted up by the spring force of the return spring for the detent rod 14. Furthermore, the upper end of the locking plate 40 is integrally provided with an downward arm 46 which acts as a switch for transferring the sliding motion of the locking plate 40 to a slider 74 (which will be explained fully hereinafter) of the control switch 70. The locking plate 40 has a portion 44 removed and upper contacting surface 44a.

The locking mechanism RC further includes a stopper plate 50 slidably received in the second guide portion 34 of the housing 30. The stopper plate 50 has a portion 55 removed and a stopper portion 51. The stopper plate 50 is arranged so that the removed portion 55 thereof receives the locking plate 40. The stopper plate 50 is movable along a direction which crosses the sliding direction of the locking plate 40 at right angles. Further, the right end of the stopper plate 50 is provided with a pin 52 which may contact the housing 30 to restrict the rightward motion of the stopper plate 50.

The locking mechanism RC, when the shift lever 10 is positioned in the P position (FIG. 2), precludes downward motion of the engagement pin 16, thereby preventing operation of the shift lever 10. The locking operation of the locking mechanism RC will now be described with reference to FIG. 2.

As shown in FIG. 2, when the shift lever 10 is positioned in the P position, the stopper plate 50 is moved to a rightmost position or a detent position in which the pin 52 contacts the housing. In this condition, the stopper surface 51 of the stopper plate 50 vertically aligns with the upper contacting surface 44a of the removed portion 44 of the locking plate 40. Therefore, the stopper surface 51 of the stopper plate 50, if the locking plate 40 is urged downward, is brought into contact with the upper contacting surface 44a of the locking plate 40 for effectively preventing the downward motion of the locking plate 40, thereby preventing the downward motion of the engagement pin 16. As a result, the locking mechanism RC is lead to a locking condition where the push button 13 can not be pushed down to operate the shift lever 10.

As shown in FIG. 2, the shift lock device L further includes a solenoid 60 as an actuator to controllably move the stopper plate 50. The solenoid 60 has a solenoid cover 61 and is received in the first chamber 36 of the housing 30. The solenoid 60 has a rod or plunger 62 which is connected to the stopper plate 50 through a flanged connector 64. The solenoid 60 has a return spring 66 placed around the plunger 62. The return spring 66 is constrained between the flanged portion of the connector 64 and the solenoid cover 61 so that the stopper plate 50 is normally resiliently urged toward the rightmost position (locking position) thereof where the pin 52 contacts the housing, as shown in FIGS. 1 and 2.

The housing 30 is provided with a releasing rod 56 which is manually movable up and down. On the other hand, the stopper plate 50 has an inclined surface 54 which contacts the lower end of the releasing rod 56. As will be appreciated, the releasing rod 56 can be manually pushed down by exerting force sufficient to overcome the force of the return spring 66, thereby leftwardly moving the stopper plate 50 against the force of the return spring 66.

Further, the locking mechanism RC and the solenoid 60 are designed so as to be sufficiently protected when the housing 30 is mounted on the shift lever supporting plate 20.

As shown in FIG. 1, the shift lock device L further includes a switch box 71 to enclose the controller 70 therein and a substrate 82 to mount the controller 80 thereon. The switch box 71 and the substrate 82 are received in the second chamber 38 of the housing 30. Also, the substrate 82 is fixedly connected to the housing 30, and the switch box 71 is connected to the substrate 82.

The control switch 70 includes a switch base 72 and a sliding member 74 sliding up and down along the switch base 72. The sliding member 74 generally has a pair of moving contacts 76, 77. The moving contacts 76, 77 are arranged so as to move along the switch base 72 to selectively contact terminals (not shown) provided on the switch base 72 when the sliding member 74 is moved along the switch base 72. This permits detection as to whether the shift lever 10 is positioned in the P position or not and generation of a corresponding signal.

The sliding member 74 is integrally provided with a pin 78. The pin 78 is outwardly projected through slots (not shown) formed on both of the switch box 71 and the housing 30, and is connected to the arm 46. The slots are mutually aligned and have an elongated form so that the pin 78 is moved therealong. When the arm 46 is moved depending on the sliding motion of the locking plate 40, the pin 78 moves along the slots to cause a sliding motion of the sliding member 74.

The controller 80 includes many kinds of electronic devices 86, such as capacitors, transistors, diodes and resistors. The electronic devices 86 are mounted on the substrate 82. The substrate 82 is provided with an input terminal and an output terminal (not shown) of the controller 80. The input terminal of the controller 80 is electrically connected to an output terminal (not shown) of the control switch 70 through a cable 83. As will be appreciated, the output terminal of the control switch 70 is provided on the switch base 72. The output terminal of the controller 80 is electrically connected to a power circuit (not shown) of the solenoid 60 through a cable (not shown) so that the controller 80 transmits a control signal to the solenoid 60.

The substrate 82 has a connector 84 for electrically connecting the controller 80 to a sensor provided on a foot brake (not shown), a sensor provided on an ignition switch (not shown), a solenoid for a key interlocking mechanism (not shown), a main electric power source (not shown) and other components. Therefore, the controller 80 may receive a signal as to whether the foot brake is operated or not and a signal as to whether the ignition switch is turned on or turned off, and also may transmit a signal to the solenoid of the key interlocking mechanism so as to energize or deenergize the same.

The operation of the shift lock device L will now be described with reference to FIGS. 1–5, 7 and 8.

To move the shift lever 10 from the R position to the P position, as previously described, the push button 13 is pushed down to lower the detent rod 14 together with the engagement pin 16, and then the shift lever 10 is moved around the shaft 18. When the shift lever 10 is shifted to the P position with the push button 13 pushed down, the engagement pin 16 is engaged with the notch 42 of the locking plate 40. Thereafter, the push button 13 is released so that the detent rod 14 is upward returned by the action of the spring force of the return spring, thereby lifting up the locking plate 40. At this time, if the solenoid 60 is deenergized, the stopper plate 50 is moved to the detent position by the action of the spring force of the return spring 66, that is, the locking mechanism RC is brought into the locking condition (FIGS. 1, 2 and 5).

As described above, when the locking mechanism RC is in the locking condition, if any force is applied to the push button 13 to lower the detent rod 14, the stopper surface 51 of the stopper plate 50 is brought into contact with the upper contacting surface 44a of the locking plate 40 for sufficiently preventing the downward motion of the locking plate 40, thereby precluding the downward motion of the engagement pin 16. Therefore, the shift lever 10 can not be operated since the engagement pin 16 remains in contact with the stepped upper edge surface 24 so as not to move beyond a step of the stepped upper edge surface 24.

In the locking condition of the locking mechanism RC, the sliding member 74 of the control switch 70 is moved to the uppermost position thereof, thereby detecting that the shift lever 10 has been shifted to the P position and generating the corresponding signal. The signal is transmitted to the controller 80. Besides the signal representative of the P position of the shift lever 10, the controller 80 is provided with the signal as to whether the foot brake is operated or not and the signal as to whether the ignition switch is turned on or turned off, as previously described.

Figure 3:
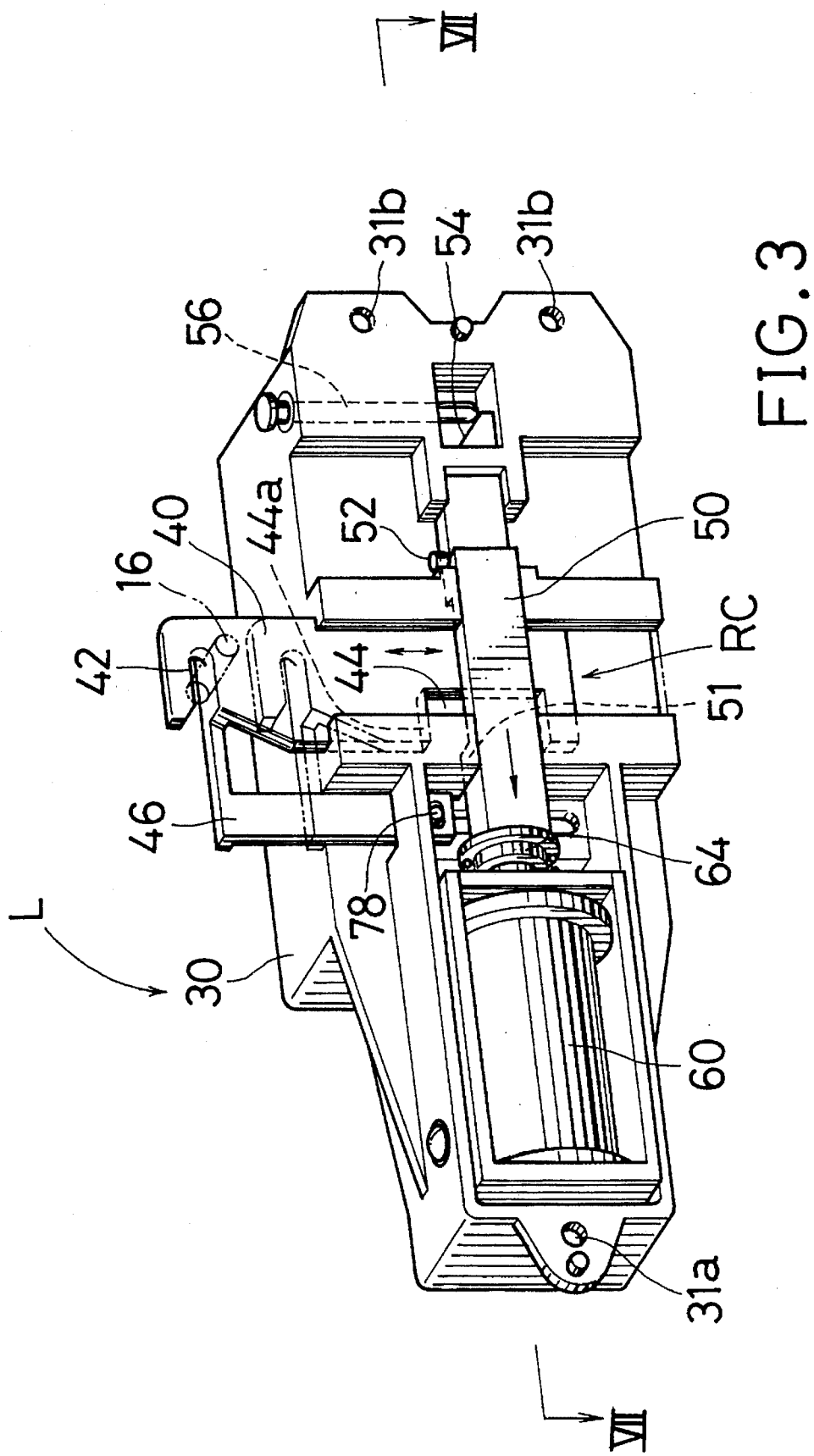
FIG. 3 is a perspective view of the shift lock device showing the condition in which the solenoid is energized to permit sliding motion of the locking plate to thereby permit operation of the engagement pin.
Figure 7:
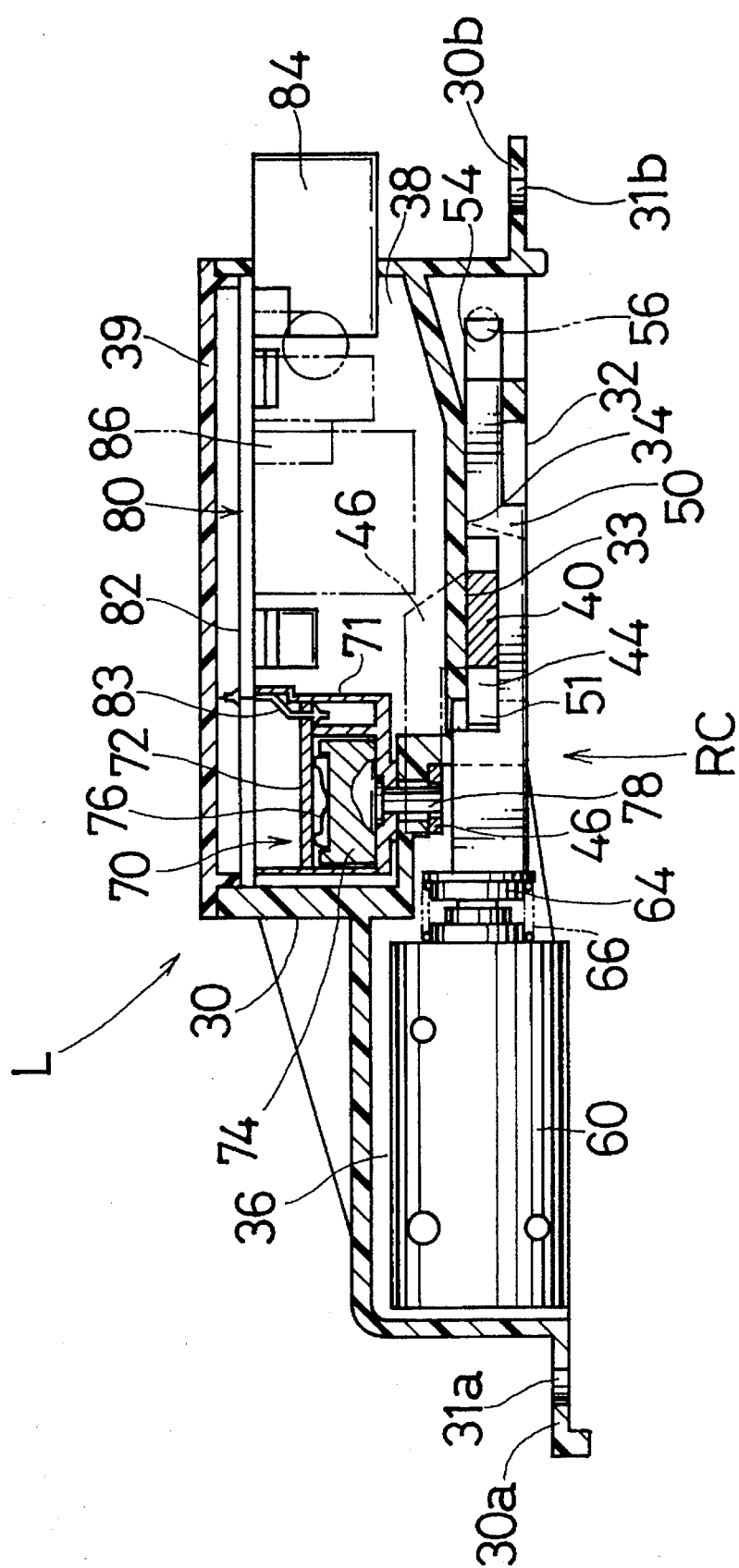
FIG. 7 is a sectional view taken along the line VII—VII of FIG. 3.

When the controller 80 simultaneously provided with the signal representative of the P position of the shift lever 10, the signal representative of the operating condition of the foot brake, and the signal representative of the turning-on condition of the ignition switch, the controller 80 generates and transmits a positive control signal to the power circuit of the solenoid 60, thereby energizing the solenoid 60. It is to be noted that the controller 80 never generates the control signal unless such three signals are simultaneously provided thereto. Upon energization of the solenoid 60, the plunger 62 receives a pulling force which is sufficiently large to overcome the spring force of the return spring 66, and the stopper plate 50 is then pulled leftwardly so that the stopper surface 51 thereof vertically misaligns with the upper contacting surface 44a of the removed portion 44 of the locking plate 40, as shown in FIG. 3 and 7. As a result, the locking mechanism RC is brought into a released condition which permits the shift lever 10 to move.

The released condition of the locking mechanism RC can also be obtained by manually pushing down the releasing rod 56 to leftwardly move the stopper plate 50 against the force of the return spring 66.

In the released condition of the locking mechanism RC, as shown in FIG. 3 and 7, the downward motion of the locking plate 40 is allowed because of the relative misalignment of the stopper surface 51 of the stopper plate 50 and the upper contacting surface 44a of the locking plate 40. Therefore, the push button 13 can be pushed down to lower the engagement pin 16 such that the engagement pin 16 is separated from the stepped upper edge surface 24 so as to be movable beyond a step of the stepped upper edge surface 24 (FIG. 5). When the engagement pin 16 is lowered to such a position, the shift lever 10 becomes operable.

Figure 4:
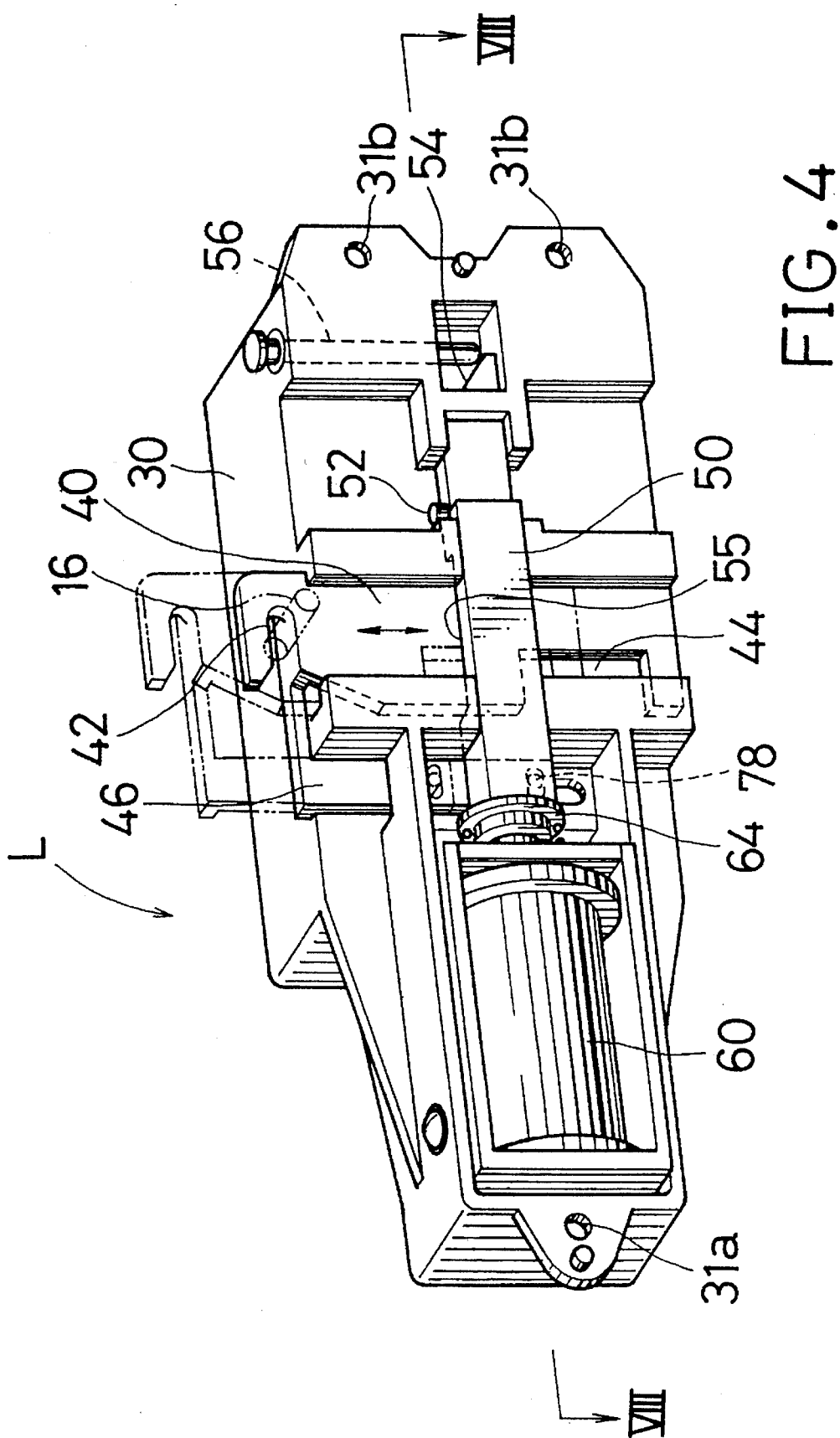
FIG. 4 is a view similar to FIG. 3 in which the engagement pin is lowered together with the locking plate.
Figure 8:
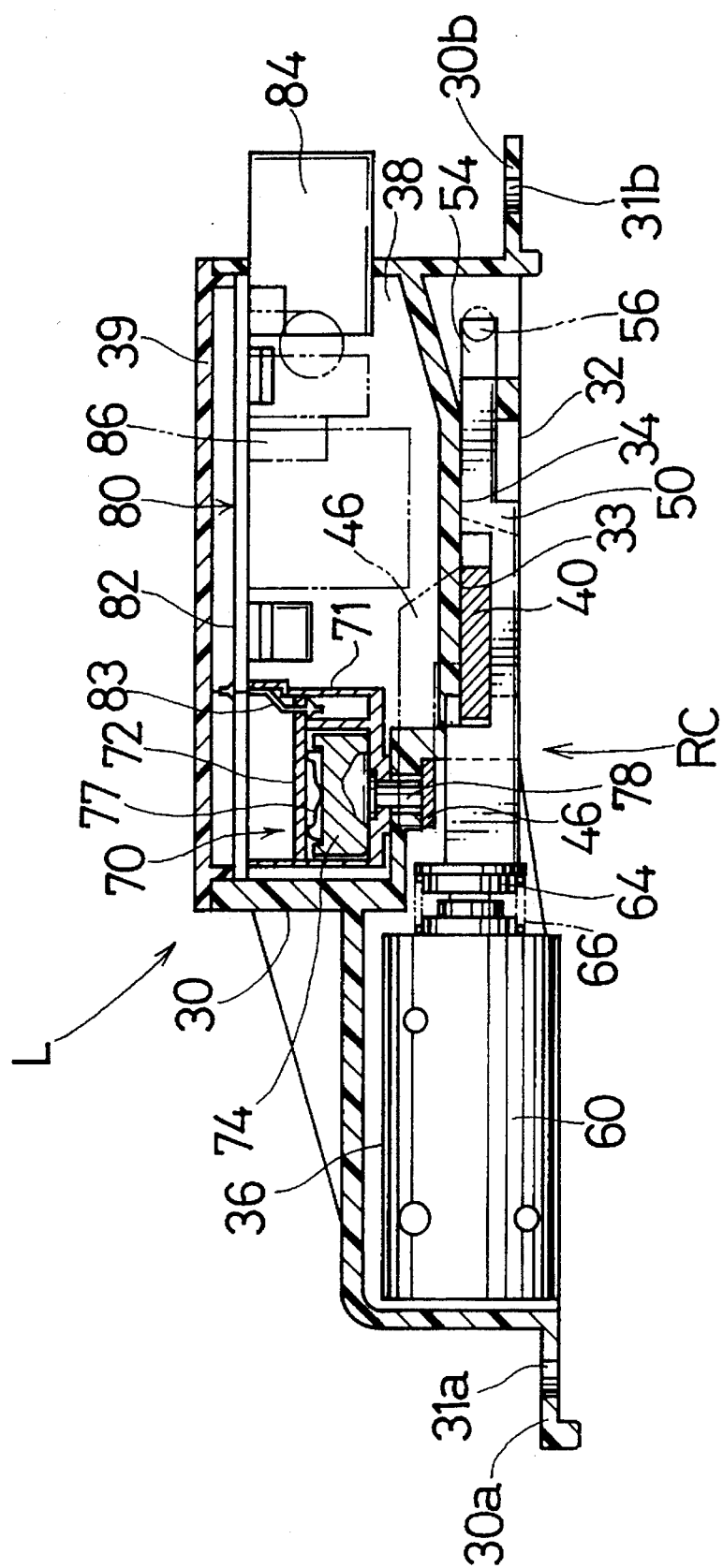
FIG. 8 is a sectional view taken along the line VIII—VIII of FIG. 4.

As shown in FIG. 4 and 8, when the push button 13 is pushed to lower the engagement pin 16, and then the shift lever 10 is shifted from the P position to the other position (for example, the R position), the engagement pin 16 is disengaged from the notch 42 of the locking plate 40. In this condition, the locking plate 40 is positioned in a lowermost position thereof. At this time, the slider 74 of the control switch 70 is also positioned in the lowermost position, thereby detecting that the shift lever 10 is shifted from the P position to the other position and generating a corresponding signal. The signal is transmitted to the controller 80.

The controller 80, when provided with the signal representative of position other than the P position of the shift lever 10, generates and transmits a negative control signal to the power circuit of the solenoid 60 to deenergize the solenoid 60. As described above, it is to be noted that the controller 80 never generates the positive control signal unless the signal representative of the P position of the shift lever 10 is provided thereto. Upon deenergization of the solenoid 60, the plunger 62 is rightwardly urged by the spring force of the return spring 66, thereby causing the stopper plate 50 to be urged rightward. However, since the locking plate 40 remains in its lowermost position, the removed portion 55 of the stopper plate 50 remains misaligned with the removed portion 44 of the locking plate 40. As a result, the stopper plate 50 remains in its leftmost position by the locking plate 40 (FIGS. 4 and 8). This is the normal condition of the locking mechanism RC where the shift lever 10 is shiftable throughout the all positions other than the P position.

To obtain the locking condition of the locking mechanism RC, the shift lever 10 is again shifted to the P position with the push button 13 pushed down so that the engagement pin 16 is reengaged with the notch 42 of the locking plate 40. Thereafter, the push button 13 is released, thereby causing the locking plate 40 to upwardly move. Upon upward movement of the locking plate 40, the sliding member 74 of the control switch 70 is moved to the uppermost position thereof, thereby detecting that the shift lever 10 is shifted to the P position and regenerating the corresponding signal. The signal is transmitted to the controller 80. In this condition, if the controller 80 is provided with the signal representative of the non-operating condition of the foot brake or the signal representative of the turning off condition of the ignition switch, the solenoid 60 remains deenergized so that the stopper plate 50 is biased to the detent position by the action of the force of the return spring 66. As a result, the locking mechanism RC is brought into a locking condition which precludes the downward motion of the locking plate 40, as shown in FIG. 2.

A second embodiment modified from the first embodiment of the present invention will now be described with reference to FIG. 6, wherein only parts different from those shown in FIGS. 1 to 5, 7 and 8 will be explained.

Figure 6:
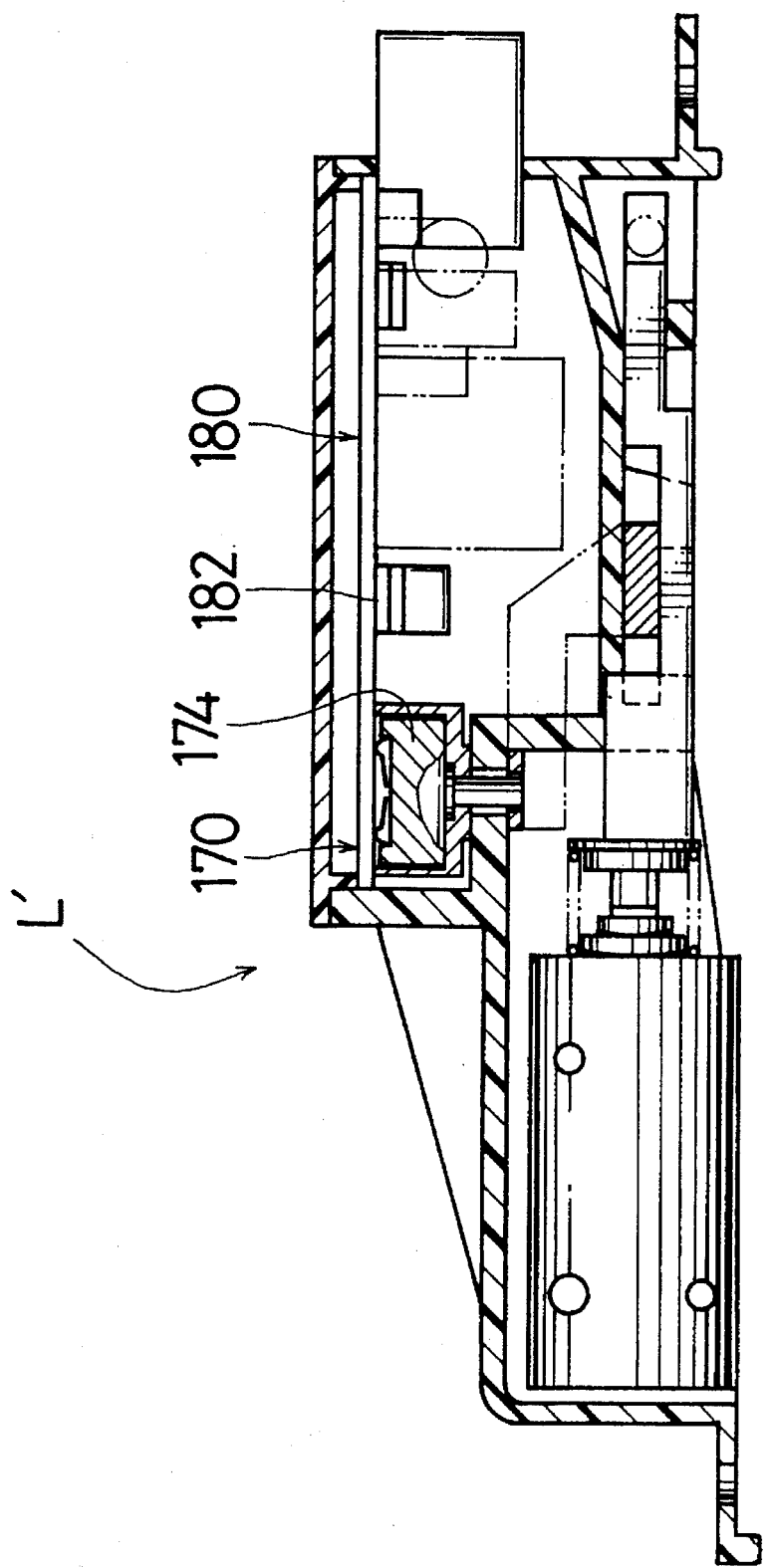
FIG. 6 is a view similar to FIG. 1 and showing a shift lock device according to a second embodiment of the present invention.

As shown in FIG. 6, in a shift lock device L' of the second embodiment, a control switch 170 does not include members comparable to the switch base 72 and the cable 83 in the first embodiment. In this embodiment, a substrate 182 may act as the switch base. A sliding member 174 of the control switch 170 moves along the substrate 182 of the controller 180. Therefore, signals from the sliding member 174 are directly provided to the controller 180 through a conductive member (not shown) printed on the substrate 182.

The preferred embodiments herein described are intended to be illustrative of the invention and not to limit the invention to the precise form herein described. It is intended to describe and to explain the principles of the invention and their application and practical use to enable others skilled in the art to practice the invention.

What is claimed is:

1. A shift lock device for precluding the operability of the shift lever which operates the automatic transmission of an automobile, by preventing an engagement pin to move when the shift lever is positioned in a parking position, wherein the engagement pin is enabled to move by operating a push button provided on the shift lever so as to permit operation of the shift lever to a desired drive position, said lock device comprising:

a locking mechanism engaged with the engagement pin for preventing operation of the engagement pin under a desired condition;

an actuator connected to said locking mechanism for releasing a locking condition of said locking mechanism under specific condition signals;

a control switch coupled with said locking mechanism, said control switch being operative to detect whether the shift lever is in the parking position or not in the parking position and generating an in or not in signal;

a controller responsive to said specific condition signals and to the signals from said control switch for generating an actuator operating condition whenever the specific condition signals and the in parking position signal are present;

a housing enclosing said locking mechanism, said actuator, said control switch and said controller and, said housing being provided with first and second guide portions, said locking mechanism including a locking plate and a stopper plate, said locking plate being slidably mounted in said first guide portion and being engaged with said engagement pin, said stopper plate being slidably mounted in said second guide portion and being connected to said actuator.

2. The device as defined in claim 1 wherein said specific condition signals are indicative of the ignition switch being turned on and the foot brake being operated.

3. A shift lock device for precluding the operability of the shift lever which operates the automatic transmission of an automobile, by preventing an engagement pin to move when the shift lever is positioned in a parking position, wherein the engagement pin is enabled to move by operating a push button provided on the shift lever so as to permit operation of the shift lever to a desired drive position, said shift lock device comprising:

a locking mechanism for preventing operation of the engagement pin under a desired condition;

an actuator connected to said locking mechanism and actuated for releasing a locking condition of said locking mechanism under a specific condition;

a control switch coupled with said locking mechanism, said control switch being operative to detect whether the shift lever is positioned in the parking position or not and generate a corresponding signal;

a controller responsive to the signal from said control switch and generating a corresponding signal for controlling said actuator;

a housing enclosing said locking mechanism, said actuator, said control switch and said controller; and said housing being provided with first and second guide portions, said locking mechanism including a locking plate and a stopper plate, said locking plate being slidably mounted in said first guide portion and being engaged with said engagement pin, said stopper plate being slidably mounted in said second guide portion and being connected to said actuator.

4. The shift lock device of claim 3 wherein said specific condition is the result of the ignition switch being turned on and the foot brake being operated.

5. The device as defined in claim 3 wherein said stopper plate includes a stopper portion, said stopper plate being positioned in one position in which said stopper portion is contactable with said locking plate to prevent sliding motion thereof to thereby prevent operation of the engagement pin when said actuator is deenergized and being positioned in the other position in which said stopper portion is not contactable with said locking plate to permit sliding motion thereof to thereby permit operation of the engagement pin when said actuator is energized.

* * * * *

UNITED STATES PATENT AND TRADEMARK OFFICE
CERTIFICATE OF CORRECTION

PATENT NO. : 5,456,133
DATED : October 10, 1995
INVENTOR(S) : Yoshitaka Sogo; Hideki Kanematsu; Kazuo Takahashi It is certified that error appears in the above-identified patent and that said Letters Patent is hereby corrected as shown below:

On the Title Page, item:

[21] Appln. No. - change "68,288" to

-- 63,288 --.

Signed and Sealed this

Twenty-sixth Day of March, 1996

Attest:

BRUCE LEHMAN

Attesting Officer

Commissioner of Patents and Trademarks